United States Patent [19]

Hofmann et al.

[11] 3,933,766

[45] Jan. 20, 1976

[54] MANUFACTURE OF INSOLUBLE AND ONLY SPARINGLY SWELLABLE POLY-N-VINYLPYRROLIDONE-2 OR COPOLYMERS OF N-VINYLPYRROLIDONE WITH OTHER N-VINYLLACTAMS

[75] Inventors: Ernst Hofmann; Karl Herrle, both of Ludwigshafen, Germany

[73] Assignee: BASF Aktiengesellschaft, Ludwigshafen (Rhein), Germany

[22] Filed: Nov. 9, 1973

[21] Appl. No.: 414,330

[30] Foreign Application Priority Data

Nov. 11, 1972  Germany............................ 2255263

[52] U.S. Cl.. 260/80.3 R; 260/78.5 UA; 260/80.72; 260/86.1 N
[51] Int. Cl.² .................... C08F 2/04; C08F 226/10
[58] Field of Search .................. 260/80.3 R, 80.72; 450/631.5

[56] References Cited
UNITED STATES PATENTS

| | | | |
|---|---|---|---|
| 2,335,454 | 11/1943 | Schuster et al. | 260/84 |
| 2,938,017 | 5/1960 | Grosser | 260/88.3 |
| 3,759,880 | 9/1973 | Hoffmann et al. | 260/80.3 R |

FOREIGN PATENTS OR APPLICATIONS

| | | |
|---|---|---|
| 1,268,391 | 5/1958 | Germany |
| 2,059,484 | 6/1972 | Germany |

Primary Examiner—Stanford M. Levin
Attorney, Agent, or Firm—Johnston, Keil, Thompson & Shurtleff

[57] ABSTRACT

Manufacture of insoluble poly-N-vinyl-pyrrolidone-2 or copolymers of N-vinylpyrrolidone-2 in the presence of a difunctional crosslinker by heating the reaction solution at temperatures above 80°C and completing the reaction at the boiling temperature of water.

3 Claims, No Drawings

MANUFACTURE OF INSOLUBLE AND ONLY SPARINGLY SWELLABLE POLY-N-VINYLPYRROLIDONE-2 OR COPOLYMERS OF N-VINYLPYRROLIDONE WITH OTHER N-VINYLLACTAMS

This invention relates to a process for the manufacture of insoluble and only slightly swellable crosslinked polymers of N-vinylpyrrolidone-2 or copolymers of N-vinylpyrrolidone with other N-vinyllactams by heating the reactants at a temperature of at least 80°C without the use of free-radical initiators or other catalysts.

It is well known that polymers of N-vinylpyrrolidone-2 are generally readily soluble in water and a large number of organic solvents. It is also known that insoluble and more or less swellable copolymers based on N-vinylpyrrolidone-2 may be manufactured by introducing difunctional vinyl or acrylic compounds having crosslinking action into the polymeric structure in conventional manner, e.g. divinyl esters of dicarboxylic acids such as succinic acid and adipic acid, diacrylates of polyhydric alcohols such as ethylene glycol and butanediol-1,4, vinyl acrylate and N,N'-divinylethylene urea. However, not even the use of relatively large amounts of difunctional components makes it possible to produce polymers showing only sparing swellability in water.

The swellability of such polymers may be determined by stirring a weighed quantity of polymer with an excess amount of water and allowing the mixture to stand for 24 hours, after which the polymer is filtered off and the weight of the gelatinous residue is determined. The swelling factor $f$ may then be calculated from the following formula:

swellability $f$ = weight of residue divided by initial weight of polymer

| Proportion of crosslinker in polymer of N-vinylpyrrolidone-2 | Swelling factor |
|---|---|
| 10% of divinyl adipate | 6.7 |
| 14% of divinyl adipate | 6.5 |
| 20% of divinyl adipate | 6.2 |
| 10% of butanediol-1,4-diacrylate | 18 |
| 5% of vinyl acrylate | 15 |
| 10% of vinyl acrylate | 8 |
| 10% of N,N'-divinylethylene urea | 9 |

When such polymers are manufactured, there is also produced a considerable proportion of soluble, i.e., uncrosslinked, polymer.

U.S. Pat. No. 2,938,017 discloses a method of producing insoluble polymerized products by heating N-vinylpyrrolidone-2 alone and without the addition of water in the presence of basic compounds such as alkali metal or alkaline earth metal oxides or hydroxides or alkoxides at 150°C and at pressure of 100 mm of Hg, the temperature of the reacting mixture rising to about 200°C. Although this produces only slightly swellable polymers, the latter show at least marked yellowing on account of the high temperature used during their manufacture. Furthermore, under these conditions the reaction is difficult to control.

German Published Application No. 1,268,391 describes a process for the manufacture of insoluble poly-N-vinylpyrrolidone-2, in which N-vinylpyrrolidone-2 is heated in the presence of water and catalysts such as alkali metal hydrides, alkali metal borohydrides and/or alkali metal or alkaline earth metal hydroxides or alcoholates in an autoclave under pressure at about 140°C until polymerization is initiated, whereupon the mixture is cooled to about 80°C and the reaction is completed at from 80° to 100°C.

Although this process also provides only slightly swellable polymers, it has the disadvantage that very high temperatures are necessary to initiate polymerization, this requiring the use of pressure vessels where water is included in the reaction mixture. Further drawbacks are the long irregular induction periods followed by a very vigorous reaction causing discoloration of the polymer.

Since insoluble and sparingly swellable polymerization products of N-vinylpyrrolidone-2 must show a high degree of purity when used as adsorbents, particularly for clarifying vegetable drinks such as beer, wine and fruit juices, it is desirable to find a way of allowing polymerization to proceed under mild conditions, both chemically and thermally, to avoid the production of decomposition products.

German Published Application No. 2,059,484 (see the corresponding U.S. Pat. No. 3,759,880) describes a process which comes very near to solving this problem. In this process monomeric N-vinylpyrrolidone is polymerized in aqueous solution in admixture with monomeric cyclic acid amides containing at least two ethylenically unsaturated groups of which at least one is attached to an amide nitrogen atom. The reaction is initiated in the presence of metals susceptible to attack by oxygen or in the presence of polymer seeds obtained from the monomers in the presence of such metals.

The said process involves a long induction period (about 2 to 3 hours) during which the temperature is raised from about 30°C at the beginning to the boiling temperature of the mixture. The actual polymerization can only be completed at this latter temperature. The cited reference proposes the use of polymerization initiators such as peroxides for shortening the induction period.

It is an object of the present invention to produce the aforementioned products in the presence of said cyclic acid amides in a shorter time.

The process for the manufacture of insoluble and only sparingly swellable, crosslinked polymers of N-vinylpyrrolidone-2 or copolymers thereof with other N-vinyllactams by polymerization or copolymerization of monomeric N-vinylpyrrolidone optionally together with other N-vinyllactams in aqueous solution and in the presence of from 0.5 to 10% by weight, based on monomeric N-vinylpyrrolidone, of a cyclic acid amide containing at least two ethylenically unsaturated groups of which at least one is attached to an amide nitrogen atom, is characterized in that the polymerization reaction is initiated by heating the reaction solution at at least 80°C and preferably at more than 90°C and completing the reaction at the boiling temperature of water.

The possibility of carrying out the reaction in the manner proposed by the present invention is unexpected, since it was always assumed that the reaction could only be effected after initiation in the presence of metallic iron or similar metals or at least by the addition of peroxide catalysts. It is also surprising that the reaction produces high-grade polymer showing sparing swellability, although the reaction is immediately started at a temperature of more than 80°C. Neither does the reaction started at this high temperature become uncontrollable, as one would have assumed.

Thus the fact that the reaction can be started at above 80°C and completed at the boiling temperature of water to give the products stated overcomes a definite prejudice.

The starting compound for the process of the invention is a commercially pure N-vinylpyrrolidone, as stated in said German Published Application No. 2,059,484. Other starting compounds are the cited cyclic acid amides having two ethylenically unsaturated groups of which at least one vinyl group is attached to an amide nitrogen atom. Examples of these compounds (hereinafter referred to as "crosslinkers" for the sake of simplicity) are N,N'-divinylimidazolidone-2 (N,N'-divinylethylene urea), N,N'-divinylhexahydropyrimidinone-2 (N,N'-divinylpropylene urea) and N-vinyl-3-ethylidenepyrrolidone-2. The amount of said difunctional compound to be used may vary from 0.5 to 10% by weight, based on the N-vinylpyrrolidone-2 used. We prefer to use from 1 to 4% by weight of said crosslinkers.

Part of the N-vinylpyrrolidone may be replaced by other N-vinyllactams. For example, up to 50% and preferably from 10 to 30% of the N-vinylpyrrolidone-2 may be replaced by N-vinylcaprolactam. Copolymers made in this manner show no differences from normal insoluble poly-N-vinylpyrrolidone. In the case of copolymerization with other vinyllactams, the amount of crosslinker used is based on the sum of all vinyllactams.

Polymerization may be carried out in aqueous solution. The water used may be distilled water or fully demineralized water. The amount of water may be varied within wide limits, a convenient amount being from 400 to 1,500% by weight based on the total N-vinyllactams. However, the presence of water is not essential in the process of the invention, but it is convenient, since it assists the stirrability of the reactants and is thus advantageous in removing the heat of reaction.

The reaction of the reaction mixture in the form of an aqueous solution of the monomers to be polymerized and the crosslinker may be initiated by simply heating it to at least 80°C, the reaction being completed at the temperature of boiling water, without any other additives (catalysts) being necessary.

Specifically, the process is carried out for example as follows:

Commercially pure monomeric N-vinypyrrolidone and crosslinker, optionally together with e.g. N-vinylcaprolactam, are made up to an aqueous solution conveniently having a concentration of from 6 to 20%. To avoid hydrolysis of the reactants it is convenient to adjust the pH of the reaction solution to weakly alkaline, e.g. to 9 to 10, by the addition of dilute caustic solution. The reaction may be carried out in any type of reaction vessel without this having any appreciable influence on the reaction product. The mixture is heated as rapidly as possible, which depends on the size of the batch, to at least 80°C and preferably to above 90°C to initiate the reaction. The large amount of water avoids local overheating (hot spots). The reaction is complete after from 2 to 2.5 hours.

The crosslinked polymers or copolymers produced in the process of the invention are insoluble in water, acids, bases and the usual organic solvents. They are only sparingly swellable in water. Their swelling factor is from 2.7 to 5. They are distinctly superior to copolymers of N-vinypyrrolidone with difunctional acrylic and vinyl compounds produced by conventional processes, as regards purity and swelling factor.

The crosslinked, sparingly swellable and insoluble polymers or copolymers produced in the process of the invention show no quality differences from the products obtained in the manner described in German Published Application No. 2,059,484. However, the simpler method of manufacture (no addition of catalyst) and the shorter induction period constitute an unexpected technical advance.

In the following Examples the parts are by weight.

EXAMPLE 1

In a stirred vessel of glass having a capacity of 1,000 parts by volume and equipped with thermometer and reflux condenser, a mixture of 100 parts of N-vinylpyrrolidone-2, 2 parts of N,N'-divinylimidazolidone-2 and 900 parts of distilled water is heated with vigorous stirring to the boil under reflux (100°C). To avoid hydrolysis of the vinylpyrrolidone, the pH of the mixture is adjusted to 9–10 by adding dilute aqueous caustic soda.

After approximately 15 minutes the first white polymer seeds appear in the reaction solution and these then visibly grow to larger agglomerates. Vigorous stirring finally produces a white aqueous suspension of granular polymer particles.

The water which evaporates during the polymerization reaction is condensed in the reflux condenser and returned to the stirred vessel. The reaction is seen to slow down markedly about 35 minutes after the appearance of the first polymer seeds. To complete the reaction, the reaction mixture is maintained at the boil for a further 2 hours with stirring. The aqueous polymer suspension is cooled and then filtered or centrifuged. The resulting polymer is washed three times with distilled water to remove soluble portions and is then dried in a vacuum drying cabinet at 80°C. There are finally obtained 89.2 parts of a pure-white, granular to crumbly polymer which is sparingly swellable in water and completely insoluble in the usual organic solvents such as hydrocarbons, alcohols, esters, ethers, ketones, organic halogen compounds and organic nitrogen compounds. It is non-meltable and shows no decomposition on heating until a temperature of above 300°C is reached.

EXAMPLE 2

Example 1 was repeated using 75 parts of N-vinylpyrrolidone, 1.5 parts of N,N'-divinylimidazolidone and 925 parts of water. The starting temperature was 100°C and the time taken for the first seeds to appear was 20 minutes. The yield of pure-white insoluble poly-N-vinylpyrrolidone was 87.8 parts.

EXAMPLE 3

Example 1 was repeated using 100 parts of N-vinylpyrrolidone, 3 parts of N,N'-divinylimidazolidone and 900 parts of water. The starting temperature was 90°C and the first seeds appeared after 35 minutes. The yield was 90 parts.

EXAMPLE 4

Example 1 was repeated using 100 parts of N-vinylpyrrolidone, 4 parts of N,N'divinylimidazolidone and 900 parts of water. The starting temperature was 100°C and the first seeds appeared after 30 minutes. The yield was 90.4 parts.

EXAMPLE 5

Example 1 was repeated using 60 parts of N-vinylpyrrolidone, 15 parts of N-vinylcaprolactam, 1.5 parts of N,N'-divinylimidazolidone and 925 parts of water. The starting temperature was 100°C and the first seeds appeared after 30 minutes. The yield was 88.9 parts.

EXAMPLE 6

Example 1 was repeated using 100 parts of N-vinylpyrrolidone, 3 parts of N,N'-divinylhexahydropyrimidone-2 and 900 parts of water. The starting temperature was 100°C and the first seeds appeared after 25 minutes. The yeild was 91 parts.

We claim:

1. A process for the manufacture of insoluble cross-linked and only sparingly swellable copolymers of N-vinylpyrrolidone-2 consisting essentially of: heating to at least 80°C monomeric N-vinylpyrrolidone-2 in an aqueous solution containing from 0.5 to 10% by weight, based on monomeric N-vinylpyrrolidone-2, of a cyclic acid amide containing at least 2 ethylenically unsaturated groups of which at least one is attached to an amide nitrogen atom to initiate the polymerization reaction of said N-vinyl-pyrrolidone-2 and said cyclic acid amide and thereafter completing the reaction at the boiling temperature of water.

2. A process as set forth in claim 1, wherein up to 50% of the N-vinylpyrrolidone-2 is replaced by N-vinylcaprolactam.

3. A process as set forth in claim 1, wherein the cyclic acid amide used is a compound selected from the group consisting of N,N'-divinylimidazolidone, N,N'-divinylhexahydropyrimidinone-2 and N-vinyl-3-ethylidene-pyrrolidone-2.

* * * * *